United States Patent [19]

Frenzel, III et al.

[11] Patent Number: 5,182,747
[45] Date of Patent: Jan. 26, 1993

[54] METHOD FOR CONTROLLING THE INSERTION OF STATIONS INTO FDDI NETWORK

[75] Inventors: James F. Frenzel, III, Bahama; Brian A. Youngman, Cary, both of N.C.

[73] Assignee: International Business Machines Corporation, Armonk, N.Y.

[21] Appl. No.: 543,893

[22] Filed: Jun. 26, 1990

[51] Int. Cl.$^5$ .............................................. H04J 3/16
[52] U.S. Cl. ................................. 370/85.5; 370/85.4; 370/85.15; 340/825.05
[58] Field of Search .............. 370/85.2, 85.3, 85.4, 370/85.5, 85.6, 85.12, 85.15, 56, 85.14; 340/825.05, 825.5, 825.51

[56] References Cited

U.S. PATENT DOCUMENTS

| | | | |
|---|---|---|---|
| 4,454,508 | 6/1984 | Grow | 370/85.5 |
| 4,596,982 | 6/1986 | Bahr et al. | 340/825.05 |
| 4,745,598 | 5/1988 | Ulug | 370/85.5 |
| 4,926,418 | 5/1990 | Cidon et al. | 370/85.5 |
| 4,951,280 | 8/1990 | McCool et al. | 370/85.12 |
| 4,979,167 | 12/1990 | McCool | 370/85.5 |
| 4,998,246 | 3/1991 | Tanaka | 370/85.5 |
| 5,068,849 | 11/1991 | Tanaka | 370/85.5 |

FOREIGN PATENT DOCUMENTS 0140712 10/1987 European Pat. Off. .
0244775 11/1987 European Pat. Off. .

OTHER PUBLICATIONS

Computer Networks and ISDN Systems, vol. 11, No. 2, Feb. 1986 Amsterdam, pp. 121-131.

Primary Examiner—Benedict V. Safourek
Assistant Examiner—Alpus H. Hsu
Attorney, Agent, or Firm—Joscelyn G. Cockburn

[57] ABSTRACT

Described is an improved method and apparatus which allows graceful insertion/de-insertion of a station into an FDDI network. The circuit arrangement known as "Roving MAC" captures a local token which is circulating on a local loop established between the Roving MAC and the station. The "Roving MAC" issues void frames while holding the local token. A circuit arrangement monitors the FDDI network. If the token on the FDDI network is sensed before the local token is released, a data frame is allowed to pass through, but the token concatenated to the data frame is switched into the station thus joining it to the FDDI network. A scrubber circuit simultaneously removes the void frames and issues idle signals on the FDDI network.

11 Claims, 10 Drawing Sheets

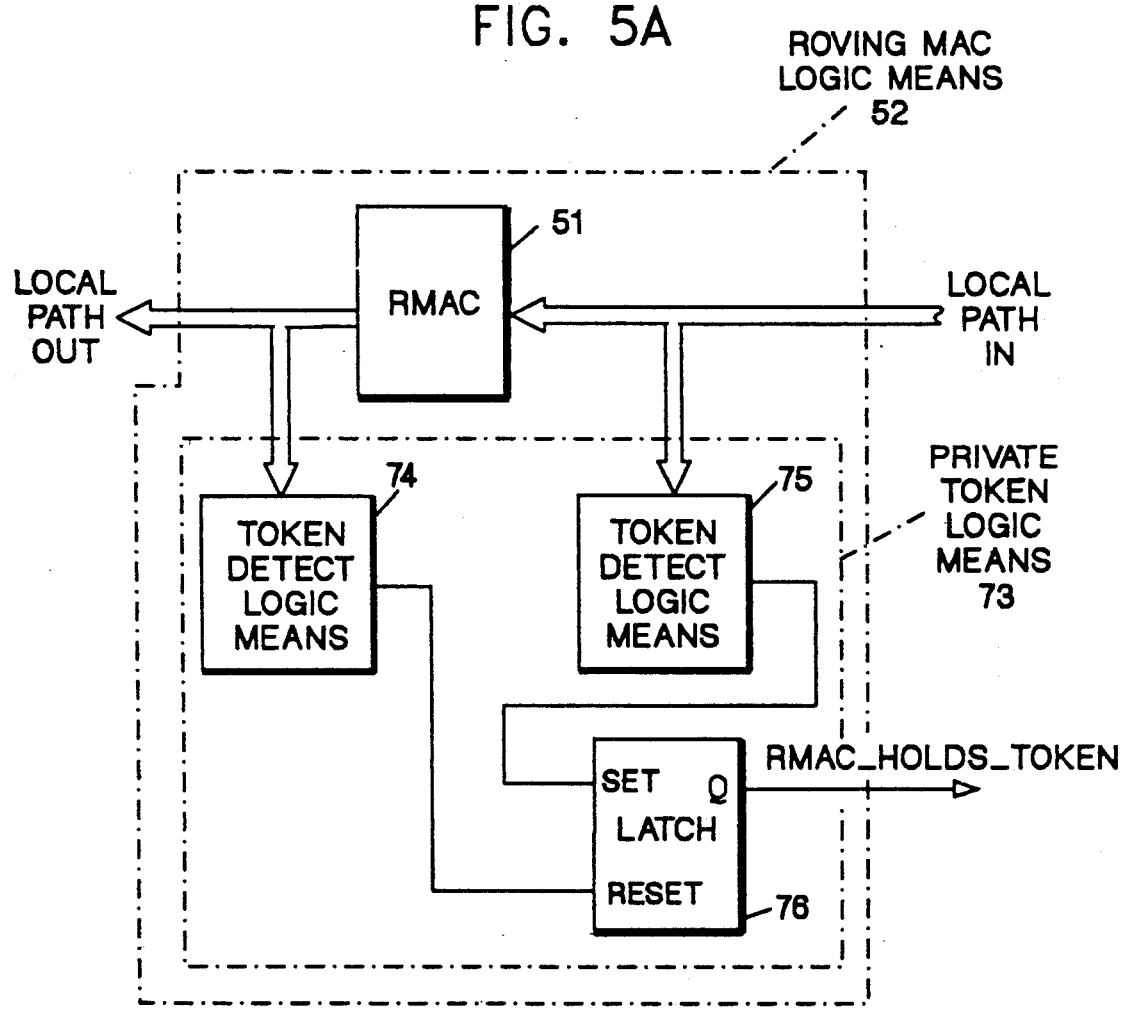

METHOD FOR CONTROLLING THE INSERTION OF STATIONS INTO FDDI NETWORK

BACKGROUND OF THE INVENTION

1. Field of the Invention

The present invention relates to communications networks in general and more particularly to Fiber Distributed Data Interface (FDDI) networks.

2. Prior Art

The American National Standards Institute (ANSI) has defined standards for a high speed [approximately 100 megabits per sec (MB/sec)] token passing Local Area Network (LAN) known as Fiber Distribution Data Interface (FDDI) network. Because of the high data rate, FDDI is well suited to serve as a backbone or a server network for other lower speed networks (e.g., the IEEE 802.5 Token Ring LAN). In addition, as more demand for higher data rates is placed on conventional lower speed LANS, such networks are unable to provide timely service and higher speed network such as FDDI is required.

Several prior art literature, including ANSI® X3T9.5, $X_{3.139}$, X3.148 and an article entitled "FDDI=The next Generation LAN" by J. Scott Haugdahl and Carl. R. Manson (LAN Technology, pg. 50, Oct. 1989), have given excellent descriptions of FDDI. The named literature is incorporated herein for purposes of background information. Basically, FDDI is a token ring network in which optical fiber and other optical components are used to form the communications media. The network includes two counter-rotating 100 Mbit/sec token passing rings. The rings consist of point-to-point interconnection between neighboring nodes. Even though a FDDI network can be configured in a variety of topologies, a typical topology uses the FDDI network as a backbone. The nodes that are connected to the optical fiber may include data terminal equipment (DTE) such as PBXs, Gateways, CPUs, Wiring Concentrators, etc. Lower data rate networks, utilization devices, etc., can be connected to the DTE. For example, the gateway may attach lower speed networks such as the IEEE 802.5, 802.4 or 802.3 LANs. The concentrator may attach devices such as workstations, PCs, printers, etc. Finally, the PBX may attach telephones. The present invention (to be described subsequently) sets forth an apparatus and method for improving the concentrator.

Data on the rings is repeated by the nodes. The rings are designated as Primary and Secondary. Although data can be transmitted on either ring, normal transmission occurs on the primary ring and the secondary ring is used as a backup in the event of a link or station failure. In the event of such a failure, the entire ring is not brought down. Instead, the failed entity is determined and the loop is reconfigured to bypass the failed entity. Even with the reconfiguration, the overall data rate of the FDDI network is not reduced. Thus, the counter-rotating dual ring design increases the reliability of the FDDI network.

As stated above, the concentrator is a specialized node that attaches to the ring and provides a plurality of ports to which other devices can be attached. Usually, the devices are connected in a starlike configuration. Each device is connected via appropriate communications media to a Concentrator Configuration Element (CCE). The CCE includes a switching mechanism which allows a device to enter (insert) or leave (de-insert from the network. Because the insert/de-insert procedure requires a physical switching of the FDDI media unless devices are inserted/de-inserted in a controlled manner, data on the FDDI media could be corrupted.

An obvious method to compensate for the data corruption is to force the higher layers of the communications architecture into a recovery procedure every time it detects data corruption due to device insertion or de-insertion on the network. The FDDI network conforms to the Open Systems Interconnection (OSI) model defined by the International Standards Organization. Under this model recovery, procedures are handled at the logical link control (LLC) layer. At this level, sophisticated software is required to recover the corrupted data. In addition, several messages have to be exchanged between the receiving device and sending device in order to recover the corrupted data. Therefore, the recovery process, at the LLC layer, is not an optimal solution in that it is wasteful of network bandwidth and places an additional burden on the link control layer.

SUMMARY OF THE INVENTION

It is, therefore, a main objective of the present invention to provide a more efficient way of inserting/de-inserting devices into/from a FDDI network.

It is another objective not to disturb data on the network during the insertion/de-insertion process.

The above and other objects are achieved by an apparatus and method that gracefully inserts/de-inserts devices into a FDDI network. The insertion/de-insertion procedure does not disrupt data on the network. The apparatus monitors the FDDI communications media and for insertion, a MUX, stationed in the data path, is made to switch once the end of the data field passes. This causes the token that is appended to the data field to be transmitted to the inserting device. For de-insertion, the MUX is made to switch after the token passes.

In particular, each concentrator is provided with a "Bound MAC" and a "Roving MAC". A MAC is an intelligent circuit arrangement or intelligent entity that observes the protocol of the shared media and can carry on a conversation or dialogue with other devices attached to the same media. These devices may be attached to the same concentrator or located elsewhere on the FDDI ring. If the MAC is dialoguing with a device attached to the FDDI counter rotating rings, the data or information is transmitted on the optical fiber forming the ring. On the other hand, if the MAC is dialoguing with a device that is attached only to the concentrator, the data or information is transmitted over the communications link that interconnects the device to the concentrator. With this in mind, the "Bound MAC" allows the concentrator to be inserted in series with other concentrators or nodes connected to the FDDI counter-rotating rings (Primary and Secondary). Devices that are connected to the same or different concentrators can communicate if one of the devices known as the originating device has the token.

Likewise, the "Roving MAC" is coupled directly to a device or devices which are connected to a single concentrator. It dialogues with the device and allows the device to insert into the FDDI counter-rotating rings. It should be noted that the "Roving MAC" can establish dialoguing with any device which is connected to the same concentrator.

With this configuration, at least two rings are defined through the concentrator. One of the rings called the main FDDI ring places "Bound MAC" of the concentrator, together with its attached devices that are inserted, in series with other inserted devices elsewhere in the ring. Communications between these inserted devices are effected on the Primary or Secondary counter rotating FDDI rings. The other ring, known as a Private or Local ring, places the "Roving MAC" in series with at least one of the devices that is connected to the concentrator. The local ring enables the "Roving MAC" to communicate with the device which is seeking entry into the FDDI network. The data path for the local ring includes the "Roving MAC", the concentrator configuration element (CCE), the device or devices, and the communications media interconnecting the named entities.

Graceful insertion/de-insertion requires operation of the Main FDDI Ring and the local ring. An initialization process known as a "Claim Process" (to be described subsequently) has been executed on the main ring and a target token rotation time is stored in the "Bound MAC". This time is transmitted to the "Roving MAC" and is bid as its Target Token Rotation Time (TTRT) in the Claim Process that is executed on the local ring. If, after the Claim Process, the winning token rotation time is the same as that of the main FDDI ring, then the inserting device is requesting a token rotation time that is equal to or greater than that of the main ring. In addition, the inserting device knows the token rotation time of the main ring and can be inserted without disrupting data on the main ring.

The process includes the steps of:

(a) Capturing the token on the local ring. The capturing is done by the "Roving MAC" which issues void frames while the CCE waits for the token on the main FDDI ring to arrive.

(b) If the token on the main ring arrives in the CCE before the token rotation timer (TRT) of the "roving MAC" expires, the CCE is placed in the insert-P state and the CCE passes the data to the downstream CCE and passes the token to the inserting station.

(c) A scrub circuit in the CCE removes the void frames from the private ring segment and simultaneously issues idle symbols on the main FDDI ring. The issuing of idle symbols and the removing of void frames continues until the scrub circuit senses the arrival of a token or a data frame.

(d) If the TRT expires and the token on he main ring does not arrive, the "Roving MAC" releases the private token and repeats the insertion process when the private token is next captured.

Even if the inserting device token rotation time is less than that of the main FDDI ring, the device is inserted using the above described process between the main network data and the main token. Again, the process of the present invention does not corrupt data on the main FDDI ring.

For non-disruptive removal, the device uses a function known as "Slave Station Bypass" to issue an explicit request to the "Bound MAC" to be bypassed by the concentrator. The concentrator configuration management function, having received the explicit request, would direct the device CCE associated with the device to change from the Insert-P state to Isolated state. The CCE then waits until the main ring token arrives at the exit point of the CCE and then changes state to bypass the device just after the token. This ensures that the bypassing operation does not interrupt network traffic. The scrub logic of the CCE will ensure that the token and the following 16 symbols are passed prior to changing to the isolated state.

BRIEF DESCRIPTION OF THE DRAWINGS

FIGS. 5A and 5B show circuit diagrams of the private token detect logic.

DETAILED DESCRIPTION

Figure 1A:
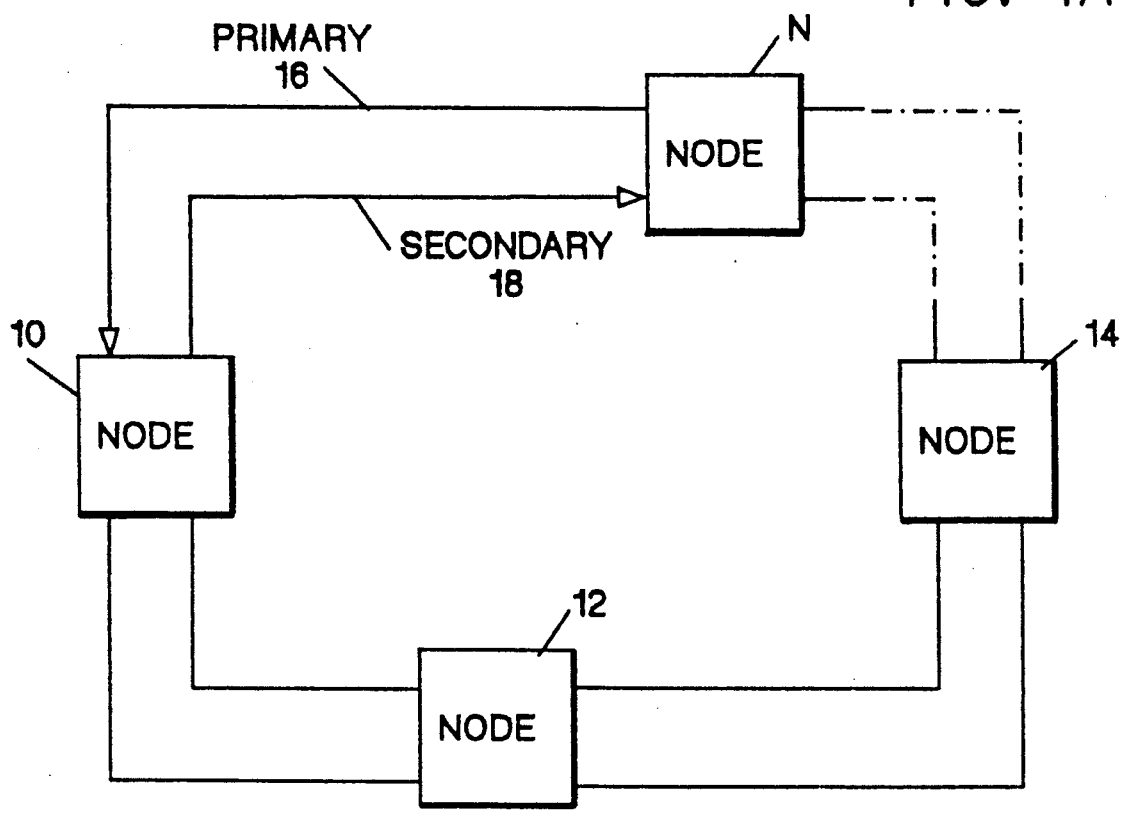
FIG. 1A shows a functional block diagram of an FDDI network embodying the teachings of the present invention.

FIG. 1A shows a schematic of a FDDI loop structured communications network. The network includes fiber optic transmission media 16 and fiber optics transmission media 18 configured into two rings and a plurality of nodes 10, 12, 14 through N interconnected to the two rings. One ring designated as the primary ring is used to transmit data; and the other ring, designated as the secondary ring is used to transmit data or as a backup for the primary ring in the event of a link or station failure. The dual ring design allows one to pass data around a defective station or path segment without slowing the network's overall data rate.

The nodes represent the access point into the network. To this end, stations (to be described later) or data terminal equipment (DTE) are connected to the nodes. Information is transmitted sequentially, as a stream of suitably encoded symbols from one active node to the next. Each node generally regenerates and repeats each symbol and serves as a means for attaching one or more devices to the network for the purpose of communicating with other devices on the network. The information flow on each ring is opposite and is indicated by the arrows on the respective rings.

Figure 1B:
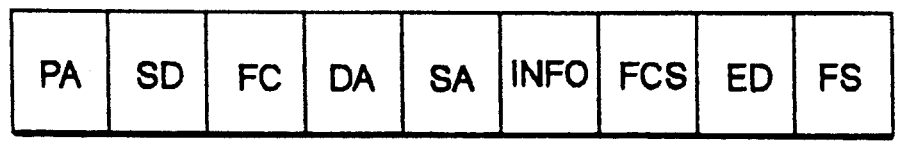
FIG. 1B shows a FDDI Frame Format.

FIG. 1B shows a FDDI frame format. The frame includes the following fields: preamble (PA), starting delimiter (SD), frame control (FC), destination address (DA), source address (SA), information (INFO), frame check sequence (FCS), ending delimiter (ED) and frame status (FS). The definitions for each of these fields are set forth in several prior art pieces of literature such as the above article by J. Scott Haugdahl et al or the FDDI standards and are incorporated herein by reference.

Figure 1C:
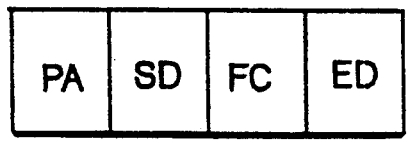
FIG. 1C shows a FDDI Token.

FIG. 1C shows the frame format for the FDDI token. As is well known, the token gives a DTE the right to transmit frames into the FDDI network. The token frame consists of a PA field, SD field, FC field and ED field. Like abbreviations have the same meaning in FIGS. 1B and 1C, respectively. Therefore, PA means the preamble and so forth. The access scheme of the FDDI network determines when a station connected through one of the nodes in FIG. 1 has permission to transmit. In FDDI, like in other token ring protocol, the access scheme is based upon the token packet which travels around the ring and which, when captured by a station, represents permit to transmit. Following the transmission, the station appends the token to the end of the frame. FDDI provides for real time applications (those that have guaranteed bandwidth or response time requirements) as well as non-real time applications with its timed token access scheme. To meet this real time requirement, each station is provided with specialized counters and registers which control the time period for which a particular station may transfer information onto the network. For purposes of this application, the token rotation timer (TRT) and the valid transmission counter (TVX) are of interest. The TRT measures the amount of time for the token to go around the ring. The relevancy of the named counter and timer will be discussed later in this document.

Referring again to FIG. 1A, one type of node which enables stations or data terminal equipment to be connected to the FDDI network is known as a concentrator. The present invention, to be described subsequently, provides an improved FDDI concentrator for attaching stations to the FDDI network.

Figure 2:
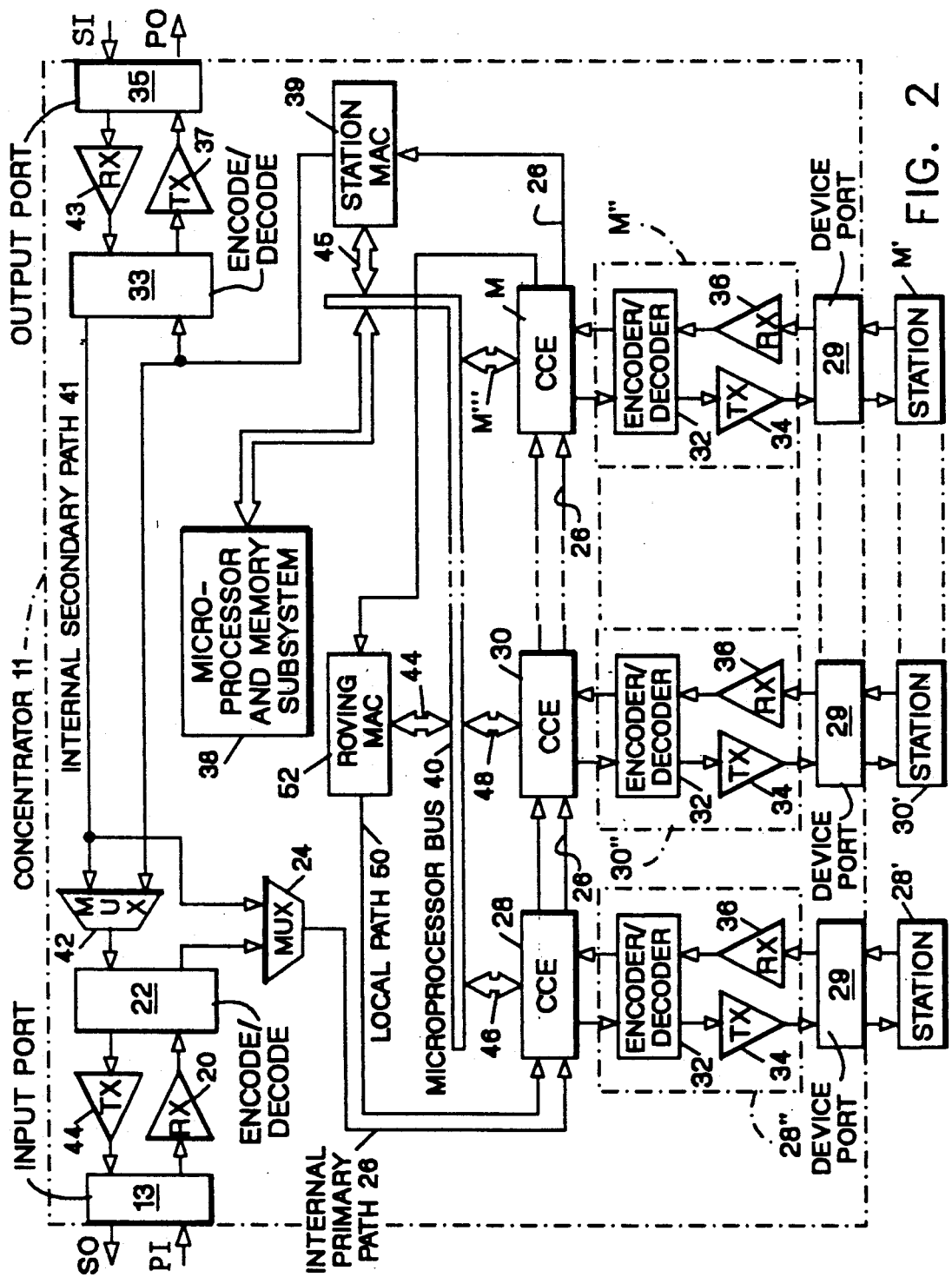
FIG. 2 is a functional block diagram of an FDDI Concentrator according to the teachings of the present invention.

Referring now to FIG. 2, there is shown a schematic diagram of the improved concentrator 11. The improved concentrator has a port 13 which receives the primary input (PI) conductor and secondary output (SO) conductor. The primary input conductor and secondary output conductor form the rotating and counter rotating rings of the FDDI network. The primary input conductor is connected by optical receiver (RX) 20, encoder/decoder 22, MUX 24 to a conductor called internal primary path 26. A plurality of concentrator configuration elements (CCE) 28, 30 through M are connected in series by internal primary path 26 to station MAC 39. Station MAC 39 is also called "Bound MAC 39". Station MAC 39 is connected by encoder/decoder 33, optical transmitter (TX) 37 to an output port 35 of the concentrator. The output port is connected to the primary output (PO) conductor and secondary input (SI) conductor. The secondary input (SI) conductor is coupled through optical receiver (RX) 43 and decoder/encoder 33 to internal secondary path 41. Internal secondary path 41 is coupled by MUX 42, encoder/decoder 22 and optical transmitter (TX) 44 to secondary output (SO) conductor. It should e noted that the PI, PO, SI and SO are fiber optic conductors.

Still referring to FIG. 2, each of the CCE 28, 30 through M interconnects station 28', 30' through M' to the FDDI network. As will be explained subsequently, depending on the state that a CCE is in, an attached station can be inserted into the internal primary path to communicate with other stations on the FDDI network or de-insert (that is, remove from its attachment to the internal primary path). Each of the stations 28', 30' through M' is connected through interconnection means 28'', 30'' through M'' to a respective CCE. Since the interconnection means 28'', 30'' and M'' are identical, only one will be described, it being understood that other interconnection means include the same component and function in a manner similar to the described interconnection means. Each interconnection means includes encoder/decoder 32, transmitter (TX) 34 and receiver (RX) 36. Appropriate transmission media interconnects each CCE to the encoder/decoder 32 and the encoder/decoder to TX and RX. Also, appropriate transmission media interconnects TX and RX to device ports 29 and the device ports are connected to the respective station. Based upon the described configuration, information from the CCE is transmitted to the encoder/decoder to TX and into the station. Likewise, information from the station is fed over appropriate communications medium into RX, from RX to encoder/decoder and into the respective CCE.

Still referring to FIG. 2, intelligence for the concentrator is provided by microprocessor and memory subsystem 38. The microprocessor is a stored program microprocessor whose personality can be changed by the program which is provided therein. The microprocessor and memory subsystem 38 has an external microprocessor bus 40 which is interconnected through buses 45, 44, 46, 48 through M''' to Station MAC 39 Roving MAC 52, CCE 28, CCE 30 through CCE M. In addition to the interval primary and secondary paths through the concentrator, a local path is also provided within the concentrator. The local path 50 forms a local ring with "Roving MAC 52 " and the CCEs. As will be described subsequently, the local ring is used for inserting station into the primary ring.

It should be noted that when stations are communicating in the FDDI network, they are connected through their associated CCE to the primary ring. The Station MAC 39 and Roving MAC 52 functions can be implemented with three chips known as (AMD) Supernet TM chip set along with some buffer memory. The chip set are provided by Advanced Micro Devices and are known as the RAM Buffer Controller (AM79C83), the Data Path Controller (AM79C82) and the Fiber Optic Ring Media Access Controller (AM79C83). The encoder/decoder function can be performed by the combination of AMD's ENDEC (AM7984) and ENDEC Data Separator (AM7985). These chips are off-the-shelf components which can be assembled using the literature supplied with them and further description regarding the interconnection, etc., will not be given here.

Still referring to FIG. 2, the microprocessor and memory subsystem, together with the station MAC 39, send and receive FDDI frames on the fDDI network. In a similar manner, the microprocessor sends and receives FDDI frames on the private or local ring through the use of "Roving MAC " 52. As stated previously, a private ring is formed when Roving MAC 52 is connected to a station via a CCE in the local state. Network traffic enters the concentrator through the primary input (PI) path. The optical receiver (RX) 20 converts the optical signal to a serial electrical data signal. The decoder portion of the encoder/decoder 22 performs a code conversion and converts the data to a parallel stream. The stream of parallel data known as network data then travels on the internal primary path to first CCE 28 of the chain of CCEs. This network data passes through CCE 28 and onto the next CCE 30, if CCE 28 is either in the Isolated or Local state. The CCE can be in an Isolated or Local or Insert-P state. Each one of these states will be described in more detail subsequently. Suffice it to say, at this point, if the CCE 28 is in the insert-P state, the network traffic is passed to the next CCE 30 in line. This process is repeated at each CCE until the last CCE M in the chain is encountered. At the output of concentrator configuration element M, the network data is passed to Station MAC 39. The network data then flows to the encoding portion of encoder/decoder 33 which encodes and serializes the data. The electrical data stream is then converted to an optical data stream by optical transmitter (TX) 37 and is sent out on the network through the primary output (PO). It should be noted that the secondary ring in this case is used only for network backup. Data on the secondary input (SI) is routed directly to the secondary output (SO) via Internal Secondary path 41. The station inserted into the network ring can also request removal from the network by sending a FDDI frame to Station MAC 39.

Still referring to FIG. 2, in addition to the primary path, there is also a Local Path. The local path 50 originates at Roving MAC 52, passes through each CCE 28, 30 through M and returns to Roving MAC 52. At each CCE 28, 30 through M, the data in this path is passed directly from the CCEs local input to its local output if the CCE is in either the isolated or insert-P state. On the other hand, if the CCE is in the local state, data entering the CCE on the local path is routed to the attached station and back to the CCE before it is passed to the next CCE in line. It is worthwhile noting that the multiplexers (MUX) shown in FIG. 2 are for station reconfiguration in the event of a network failure. Also, the stations 28', 30' through M' can be inserted into the private ring for the purpose of access control and extended diagnostics.

Figure 3:
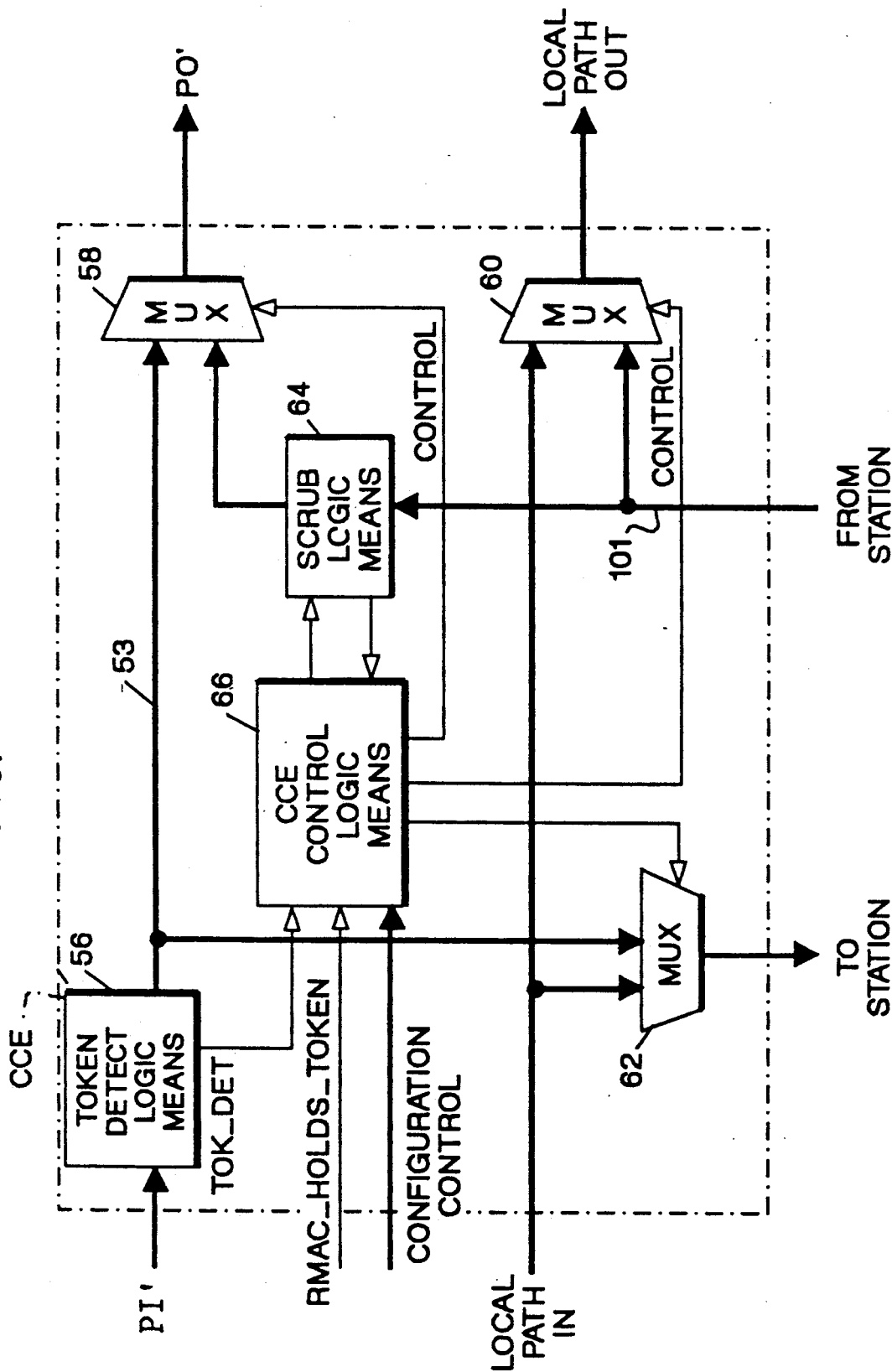
FIG. 3 is a circuit block diagram of a Concentrator Configuration Element (CCE) according to the teachings of the present invention.

Referring now to FIG. 3, there is shown a circuit diagram for the CCE. The circuit structure for the CCEs is identical, therefore, the description relative to FIG. 3 can be used to configurate any of the CCEs shown in FIG. 2. As described above, the function of the CCE is to provide the mechanism by which data on the primary path 53 and the local path 54 is either routed passed the station which the CCE attaches to the concentrator or into the station. The CCE includes a token detect logic means 56 which is inserted in the primary path 53 at the entrance of the CCE. The primary path 53 exits the CCE through MUX 58. The primary path 52 from MUX 58 is connected to primary output path PO'. Similarly, the input section of primary path 53 is captioned primary input (PI'). In addition to primary path 53, there is also a local path 54 through the CCE. The local path 54 provides the mechanism through which a local station gains access to the FDDI network. The local path originates at the Roving MAC (RMAC) (FIG. 2), passes through each of the CCE and returns to the RMAC. At each CCE, the data on the local path is passed through MUX 60 to the local path out or through MUX 62 to an attached station, not shown. Whether the data on the local path is passed to MUX 60 and to the local path out or through MUX 62 to the attached station and from the attached station to MUX 60 or scrub logic means 64 depends on the state of the CCE. The data on the local path will pass directly from Local Path In to Local Path Out if the CCE is either in the Isolated or Insert P state. On the other hand, if the CCE is in the Local State, data at the Local Path In is routed to the attached station (not shown) and back before it is passed to the downstream CCE in line. As will be explained subsequently, the function of scrub logic means 64 is to remove "Void Frames" generated by the Roving MAC before the station which is attached to a CCE is inserted in the FDDI network. By removing the Void Frames, orphan Protocol Data Units (PDUs) or concatenated PDUs are prevented from entering main ring. The CCE control logic means 66 generates control signals which are used to control the multiplexers and the scrub logic means. The CCE control logic means 66 also receives control signals on the simplex lines labeled TOK-DET, RMAC-Holds-Token, and Configuration Control. Each of these control signals will be described, subsequently, in more detail.

Figure 4:
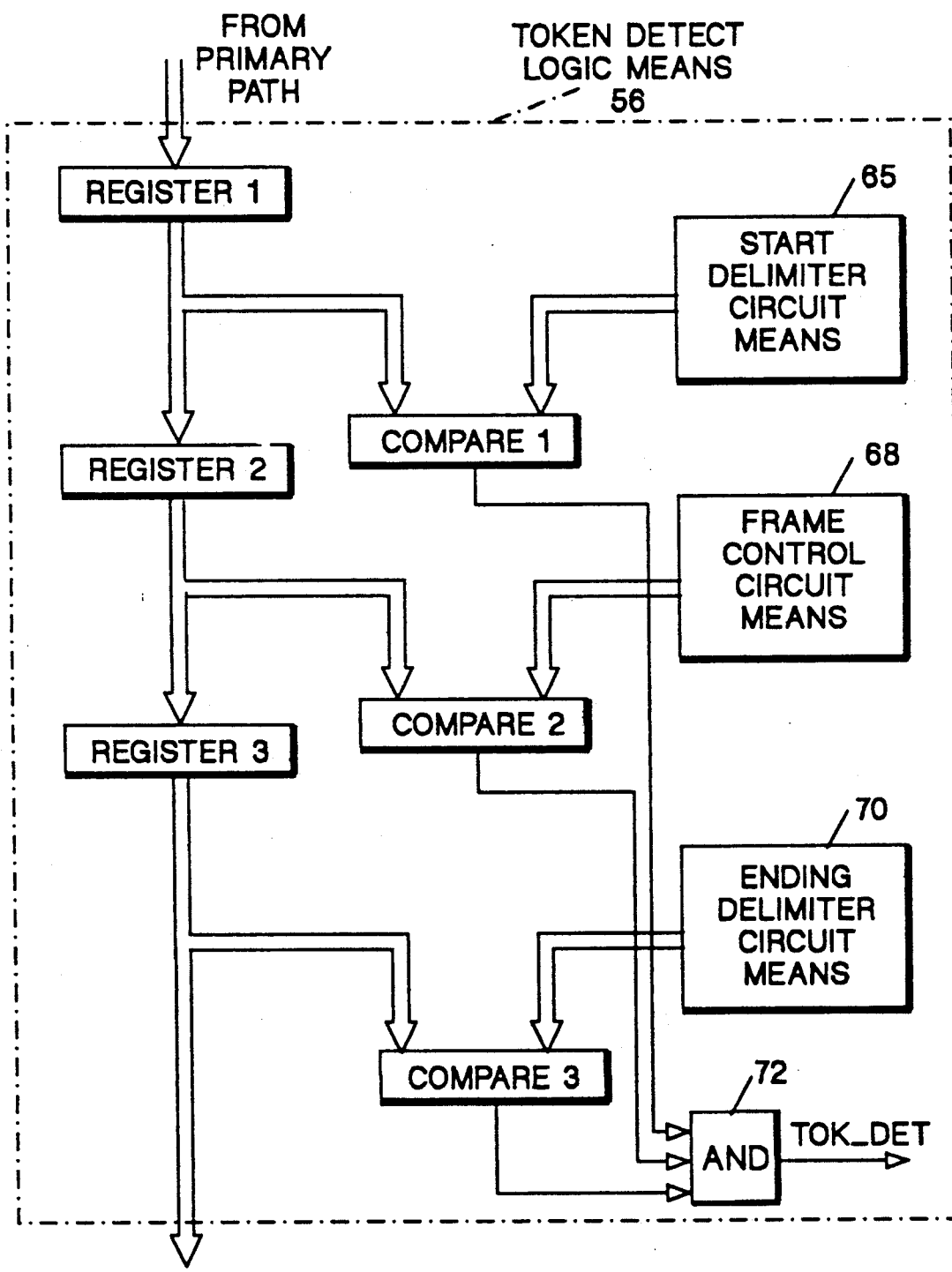
FIG. 4 is a circuit block diagram of the main token detect logic.

FIG. 4 shows a schematic of token detect logic means 56. The function of token detect logic means 56 is to monitor the primary path and when the token is detected, generate a control signal known as (token detect) on the conductor label TOK-DET. As stated previously, this signal (token detect) is used by CCE control logic means 66 (FIG. 3). It should be noted that symbols of the data stream may be clocked into token detect logic means 56 as a serial bit stream, or as a parallel bit stream of symbols or group of symbols. The token detect logic means 56 (FIG. 4) uses a parallel scheme with a data width of two symbols (10 bits). The start delimiter circuit means 65, frame control circuit means 68 and ending delimiter circuit means 70 generate a bit pattern representative of a token. Register 1, register 2 and register 3 capture the actual bit pattern on the primary path and compares it. via (comparator 1, comparator 2 and comparator 3) and output logical 1's into AND circuit 72 when the bit pattern on the main loop matches the bit pattern representative of the token. With logical 1's on all the inputs of the AND circuit 72, there is also a logical 1 on he output which indicates that the token on the main ring is within the token detect logic means 56. In summary, token detect logic means 56 outputs a logical "1" on the TOK-DET line when it has recognized the token to the primary path data stream.

Before describing the token detect logic means 56 in greater detail, a summary description of the FDDI data stream will be given. With reference to FIG. 1B and 1C, the FDDI data stream consists of code groups. A code group consists of five consecutive code bits which represent a symbol on the medium. Sixteen of the thirty-two possible bit combinations are used for data symbols representing the hexidecimal values 0 through F. Control symbols are represented by eight of the remaining sixteen code groups. These symbols are referred to as J, K, T, R, S, Q, I, and H. The balance of the bit combinations, if encountered, are interpreted as or converted to one of the control symbols by the receiving physical layer entity. The FDDI token consists of a pattern of six symbols. There are two control symbols that form the starting delimiter (J, K), two data symbols that identify the frame as a token (8, 0), and two symbols that form the ending delimiter (T, T).

Turning again to FIG. 4, the implementation uses a parallel scheme with a data width of two symbols (10 bits). The data stream is clocked through a series of three registers (register 1, register 2 and register 3). The output of each register is clocked over associated buses to one of three compare logic circuits mean (compare 1, compare 2 and compare 3). Each of the two symbols of the FDDI token are generated by start delimiter circuit means 65, frame control circuit means 68 and ending delimiter circuit means 70. He output from the start delimiter circuit means 65, frame control circuit means 68 and ending delimiter circuit means 70 are fed over appropriate buses to compare logic means 1, compare logic means 2 and compare logic means 3. The compare logic performs a bit by bit comparison of its two input buses. If all the corresponding bits are the same value, then the output is true logical 1. Appropriate circuitry for implementing the compare logic means is well within the skill of the art, therefore, detailed description of the compare logic circuit means will not be given. Suffice it to say that 10 Exclusive NOR gates (XNOR) followed by a 10-way And gate are appropriate logic blocks for building the compare logic circuit means. With this implementation, the inputs of each XNOR gate are the bits which are compared from each bus. When these bits are the same, the output of the XNOR will be true (logical 1). Each of these outputs is fed to one of the 10 inputs of the And gate. The output of the compare logic would be true (logical 1) when all of the bits of one bus match the corresponding bits of the other bus. For token detection, the contents of the data stream held in register 3, register 2 and register 1 must match the fixed bit pattern which represent the value of the FDDI token (J, K, 8, 0, T and T). The logic of compare 3 compares the contents of register 3 with bit pattern that represents the control symbols J, K. Likewise, compare 2 compares the contents of register 2 to the bit pattern for data symbols 8, 0 and compare 1 compares the contents of register 1 to the bit pattern for control symbols T, T. When all of these are true, simultaneously, then the token is present in those registers and the signal on the line labeled TOK DET is true (logical 1).

Figure 5B:
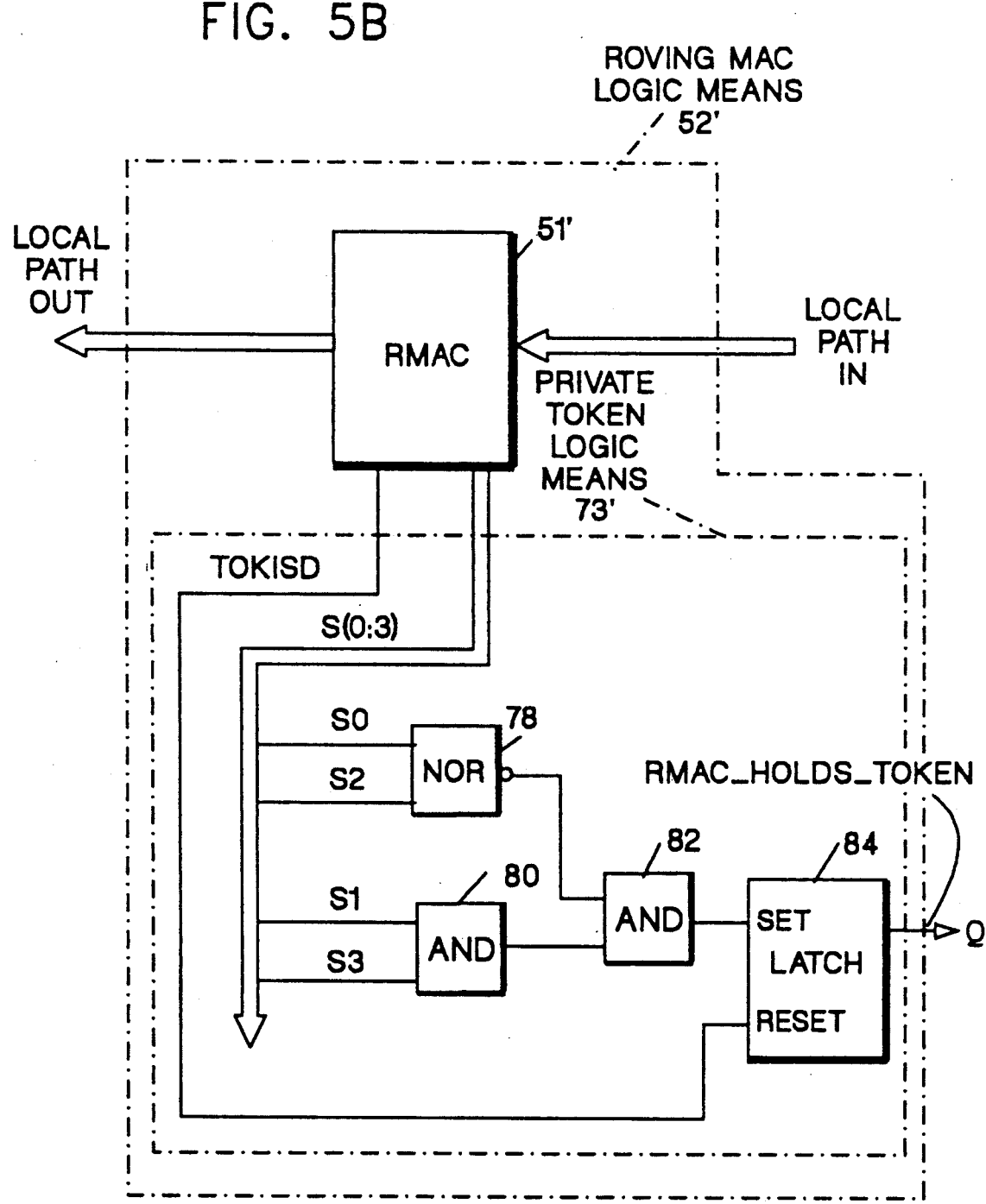

FIGS. 5A and 5B show circuit schematics for generating the control signal (RMAC—Holds-Token) which is outputted on the line labeled RMAC—Holds-Token. The roving MAC logic means 52 (FIG. 5A) includes Roving MAC (R MAC) 51 and private token logic means 73. It should be noted that like elements in FIGS. 5A and 5B are labeled with identical numerals with prime notation identifying numerals that are in FIG. 6B. When RMAC is in possession of (that is, holding) the token, the private token logic means 73 sets the RMAC Holds-Token signal to a true (logical 1) state. When the RMAC reissues the token, the private token logic resets the RMAC Holds-Token line to a false (logical 0) state. With reference to FIG. 5A, token detect logic means 74, 75 and latch 76 are used to generate the RMAC Holds-Token control signal. The token detect logic means 74, 75 which are similar to the previously described token detect logic means 5, FIG. 4, straddle RMAC 51 and monitor the data stream at its entrance and exit (FIG. 5A). The direction of signal flow in FIG. 5A is shown by the arrow heads. The IN token detect logic means 75 position at the entrance of RMAC detects the presence of a token on a local path in and sets latch 76. When the token exits RMAC 51, OUT token detect logic means 74 senses the token on the local path out and resets latch 76. Therefore, the output from latch 76 represents the signal RMAC Holds-Token.

FIG. 5B shows an alternate embodiment for the Roving MAC (RMAC) logic means. The embodiment uses an off-the-shelf module for RMAC, and logic circuits 78, 80, 82 and latch 84 for the private token logic means 73'. As stated previously, RMAC could be implemented with the Supernet ™ chip set from Advance Micro Devices (AMD). One of the chips known as FORMAC (AM79C83) provides signals that would be useful in implementing the private token logic. The FORMAC chip has a bus S(0:3) with logic signal S0, S2, S1 and S3. The four signals generate a pattern 0101 when RMAC has captured a free token. By grouping the appropriate signal to logic circuits 78, 80 and 82, the output from And circuit 82 sets latch 84 when the proper bit pattern is present on conductor S0, S2, S1 and S3. The AM79C83 chip also provides an output labeled "TO-KISD" when a token has been issued. Thus, when the signal on the line label TOKISD is true (that is, logical 1) latch 84 is reset and the RMAC Holds-Token is in a down state (logic 0). As will be explained subsequently, RMAC holds the token, circulating on the private ring until its Token-Holding-Timer expires; whereupon, RMAC issues another token.

Figure 6:
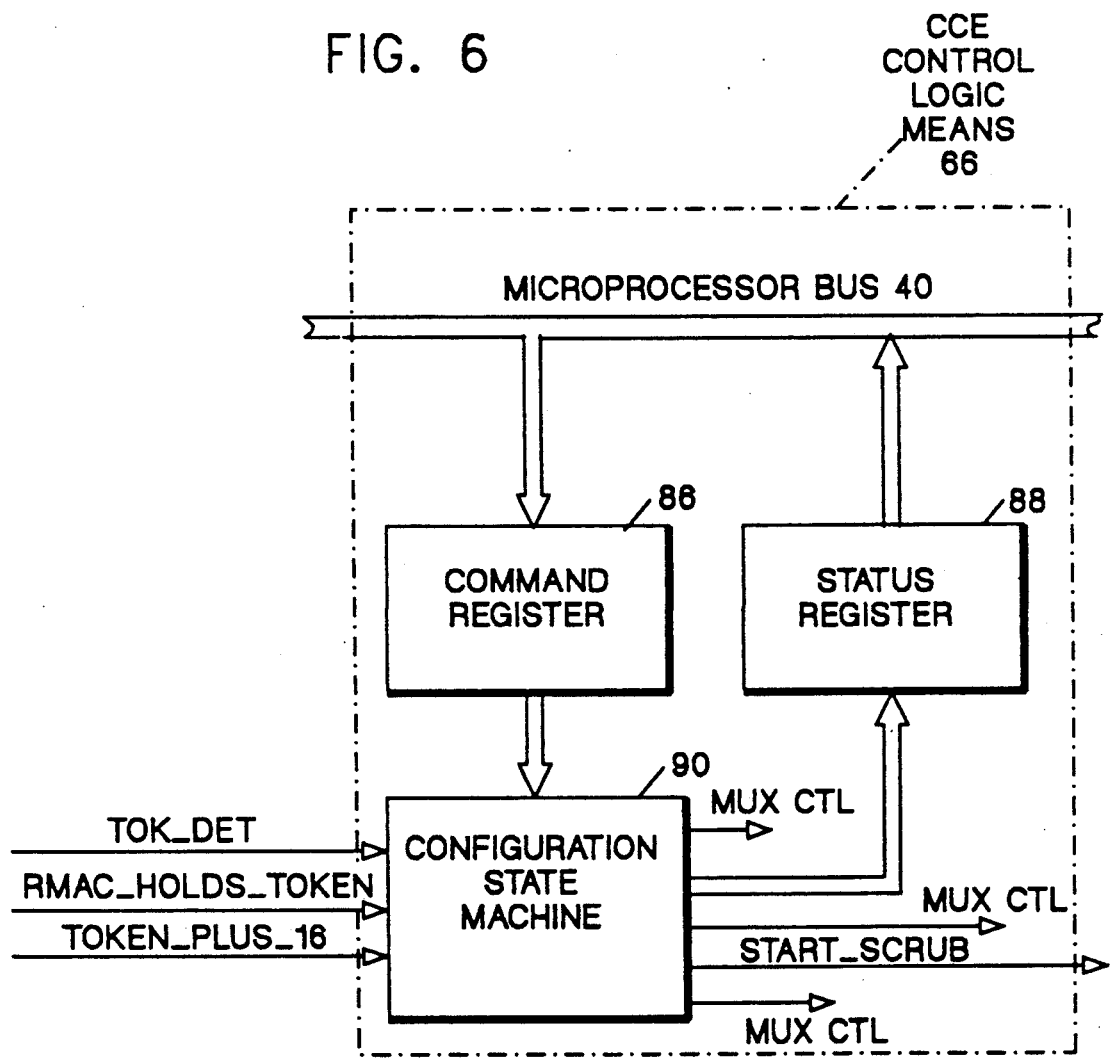
FIG. 6 shows a circuit diagram of the CCE control.

FIG. 6 shows a circuit schematic of the CCE control logic means 66. The CCE control logic means 66 includes command register 86, status register 88 and configuration state machine 90. The command register 86 and the status register 88 are coupled through microprocessor bus 40 to the microprocessor and memory system 38 (FIG. 2). The registers in the controller are accessed by the microprocessor over the microprocessor bus. The status register 88 indicates the current state of the configuration state machine. As stated previously, the CCE can be in any of three states. The configuration state machine which controls the states of the CCE can be in any of the three states; namely, Isolated, Insert-P or Local. The command register is used to change the state of the configuration state machine under the control of the microprocessor. By changing the value in command register 86, the microprocessor can change the state of the configuration state machine. A bit pattern written in the command register corresponds to the desired state of the configuration state machine.

Still referring to FIG. 6, the configuration state machine is implemented with a group of latches (not shown). Each combination of value of these latches represents a possible state. Since there are only three states, the implementation requires two latches. Movement from one state to another is controlled by the current value of these latches and the value of other input signals. These signals include Token Detect (TOK-DET), RMAC-holds-Token and Token-Plus 16. In this case, the configuration state machine uses the contents of the command register, the token detect signal and RMAC-Holds-Token signal as inputs. The configuration state machine is initialized to the isolated state when the concentrator is powered on and an application or control program known as "concentrator configuration management" (CCM) is loaded and executed on the microprocessor. In this way, the microprocessor assures the proper interconnection of a device within the concentrator. The microprocessor writes a value into the command register 86 to move to the Local State when a remote station becomes active on the associated port. The station is inserted into the local path (previously described) where extended diagnostics can be executed to make sure the station is operational before it is inserted into the primary path. When the station is ready to be inserted into the FDDI network (via the primary path), the microprocessor changes the contents of the command register 86 to a value corresponding to the Insert-P state. In addition to the command register, the state machine waits until both the Token Detect and RMAC-Holds-Token signals are true (that is, logical 1's) before changing to the Insert-P state. This allows network traffic to pass through the CCE to the network while the network token is passed to the inserting station.

Still referring to FIG. 6, for de-insertion the station sends a de-insert message to Station MAC 32 (FIG. 2).

The microprocessor 38 (FIG. 2) processes the message and changes the contents of the command register to a value corresponding to the Isolated State. Before moving to the Isolated State from the Insert-P state, the configuration state machine 90 waits until a signal appears on the input line labeled Token-Plus-16. This signal is active when the token plus 16 symbols are sensed at the output or exit of the CCE. By waiting until the respective control logic signals are active on the input of configuration state machine 90, a station can be inserted or de-inserted from the FDDI network without disturbing signals on the network.

Referring now to FIGS. 3 and 6, the CCE control logic means 66 provides a number of output signals that are used to control multiplexers 58, 60, 62 and scrub logic means 64. The control signals to each multiplexer determines which group of input signals will be selected to appear at the multiplexer output. The value or state of each signal depends upon the state of the configuration state machine 90 (FIG. 6). In the Isolated State, data on the primary and local path inputs are routed to the primary and local path outputs, respectively. In the Local State, data on the local path is routed to the station and then back to the local path output, while the data on the primary path input is routed to the primary path output. In the Insert-P state, data on the primary path input is routed to the inserted station and then back to the primary path output while the data on the local path input is routed to the local path output. An additional signal called Start Scrub outputted on a line labeled Start Scrub (FIG. 6) is active during the transition from the local state to the Insert-P state. The start scrub signal indicates to the scrub logic (to be described subsequently) that it should begin scrubbing (that is, removing the data returning from the remote station by changing the symbols to idle symbols).

Figure 7:
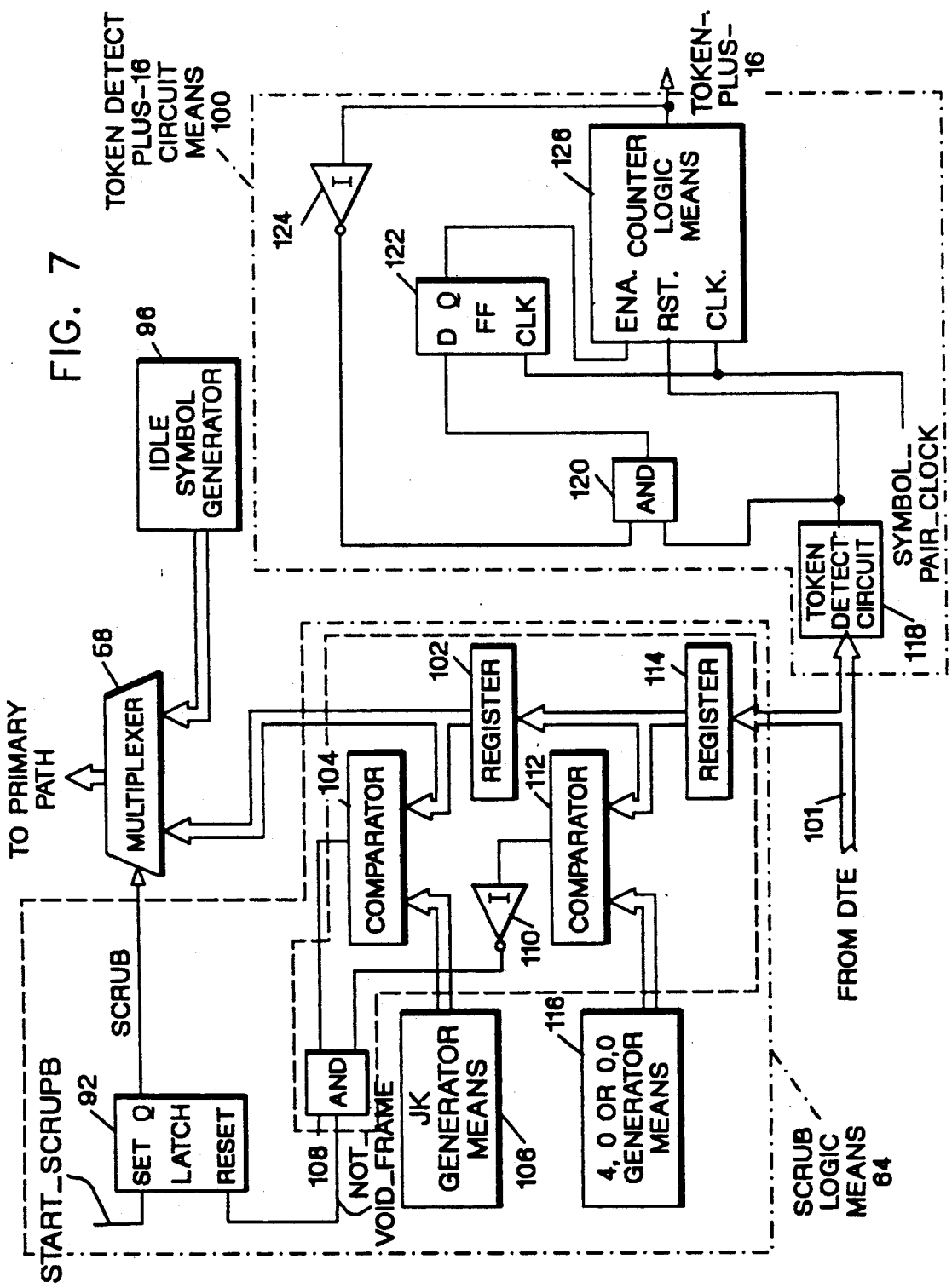
FIG. 7 shows a logic diagram for the scrub logic.

FIG. 7 shows a circuit diagram of the scrub logic means 64 (FIG. 3). The scrub logic is activated whenever a station is being inserted into or removed from the FDDI network. It prevents unwanted signals, known as orphan PDUs, from entering the main FDDI ring. The scrub logic means 64 includes latch 92, FDDI frame detect means 94, idle symbol generator 96 and token detect-plus-16 circuit means 100. The idle symbol generator 96 contains bit values representative of the FDDI idle symbols (I,I). The function of FDDI frame detector means 94 is to generate a signal on the line labeled "Not Void Frame" to reset latch 92 when the circuit senses the beginning of a non-void FDDI Frame on the bus 101 from the device or DTE. The latch 92 is set by the CCE control logic means 66 (FIG. 3). The FDDI frame detect means 94 include register 102 whose output is fed into comparator 104. Another input into comparator 104 is from a J, K generator means 106. The J, K generator means 106 has bit values which represent the FDDI symbols JK. The output from comparator 104 is fed into one leg of a two-way And circuit 108. The other leg of And circuit 108 is from inverter 110. The input to inverter 110 is from comparator 112. Comparator 112 compares the output from register 114 and 4,0 or 0,0 generator means 116. Generator means 116 is set to bit values which are representative of FDDI symbols 4,0 or 0,0. The Token Detect-Plus-16 circuit means 100 comprises token detect circuit 118, And circuit 120, latch 122, inverter 124 and counter logic means 126.

Still referring to FIG. 7, when the CCE is reconfigured from the Local State to the Insert-P State, any data that may be on the link joining the station to the concentrator would appear on the network. Usually, this data includes "Void Frames" which the RMAC on the local loop generates while it holds the local token. To prevent this from happening, scrub logic substitutes idle symbols, I,I, onto the network until it encounters symbols representing the beginning of a Non-Void FDDI frame.

During the transition from the Local State to the Insert-P State, the CCE control logic (FIG. 3) generates a start scrub signal. The signal sets latch 92 (FIG. 7). The output of this latch on the line labeled Scrub is used to control multiplexer 58. When the scrub signal is true (logical 1), multiplexer 58 selects the bit pattern (idle symbols I,I) generated from the idle symbol generator 96 as its output. The output of idle signal continues until the beginning of a non-void frame is encountered when a control signal is outputted on the line labeled Not Void Frame to Reset, latch 92. The beginning of a void frame is identified by a pair of control symbols J, K generated by generator means 106 followed by a pair of data symbols equal to either 4,0 or 0,0 generated by 4,0 or 0,0 generator means 116. When J,K is encountered and the next two symbols are not 4,0 or 0,0, then the Not-Void Frame signal is generated on the line labeled Not-Void Frame to reset the latch 92. With latch 92 reset, the Scrub signal on the line labeled scrub becomes false (logical 0) and the multiplexer 58 sends data from the station through beginning with the symbols J,K.

Still referring to FIG. 7, if the remote station is to be removed from the network, the CCE control logic delays moving from the Insert-P State to the Isolated State until the Token and sixteen symbols following it have cleared the CCE. This is accomplished by the use of token detect means 118 and counter logic means 126. The combination generates the signal Token-Plus-16 required to control the configuration state machine 90 (FIG. 6). The token detect means 118 is implemented with the circuit previously described. When the token arrives, a latch 122 is set. The enable control signals become true (logical 1) and the counter logic means 126 is reset to a count of 0. The counter logic then counts to a value that corresponds to the transfer of the token plus 16 symbols through the CCEs primary path output multiplexer 58. At this time the token-plus-16 signal becomes active, the configuration state machine changes to the isolated state and the enable counter signal is reset to false logical 0.

OPERATION OF THE SYSTEM

Station insertion is a process by which stations join either the primary or secondary ring for the purpose of data communication with other stations on the FDDI network. Station removal is a process by which the station having satisfied its need for the FDDI network removes itself from the network facility. Preferably, it is desirable to accomplish the insertion and removal process in a manner that is not unnecessarily disruptive. In particular, stations joining or leaving the FDDI network should not unnecessarily initiate a claim process or interfere with data traffic on the ring. Such interference causes the logical link control of the affected stations to initiate data recovery procedures which detracts from the overall performance of the network.

As is evident from the above description, stations attached to the concentrator (FIG. 2) are first connected through its related Concentrator Configuration Element (CCE) to the concentrator's roving MAC logic means 52 (FIG. 2). In this configuration, the roving MAC and the remote station form a private ring. The roving MAC and the station to be inserted carry out the Claim Process to initialize the ring. The Claim Process is a standard initializing process, the details of which are set forth in the above described FDDI standard and is incorporated herein by reference. The Roving MAC, having knowledge of the Main Ring's Token Rotation Time, will bid this value as its target token rotation time (TTRT) in the Claim Process. After the Claim Process, if the winning token rotation time is the same as that of the main ring, then the inserting station is requesting a token rotation time that is equal to or greater than that of the main ring. The station will now know the token rotation time of the main ring and have the potential of being inserted without the disruption caused by the Claim Process. Even if the inserting station has a requested token rotation time that is less than that of the main ring, the present invention still allows insertion in a way that minimizes the impact to data traffic on the ring.

Figure 8:
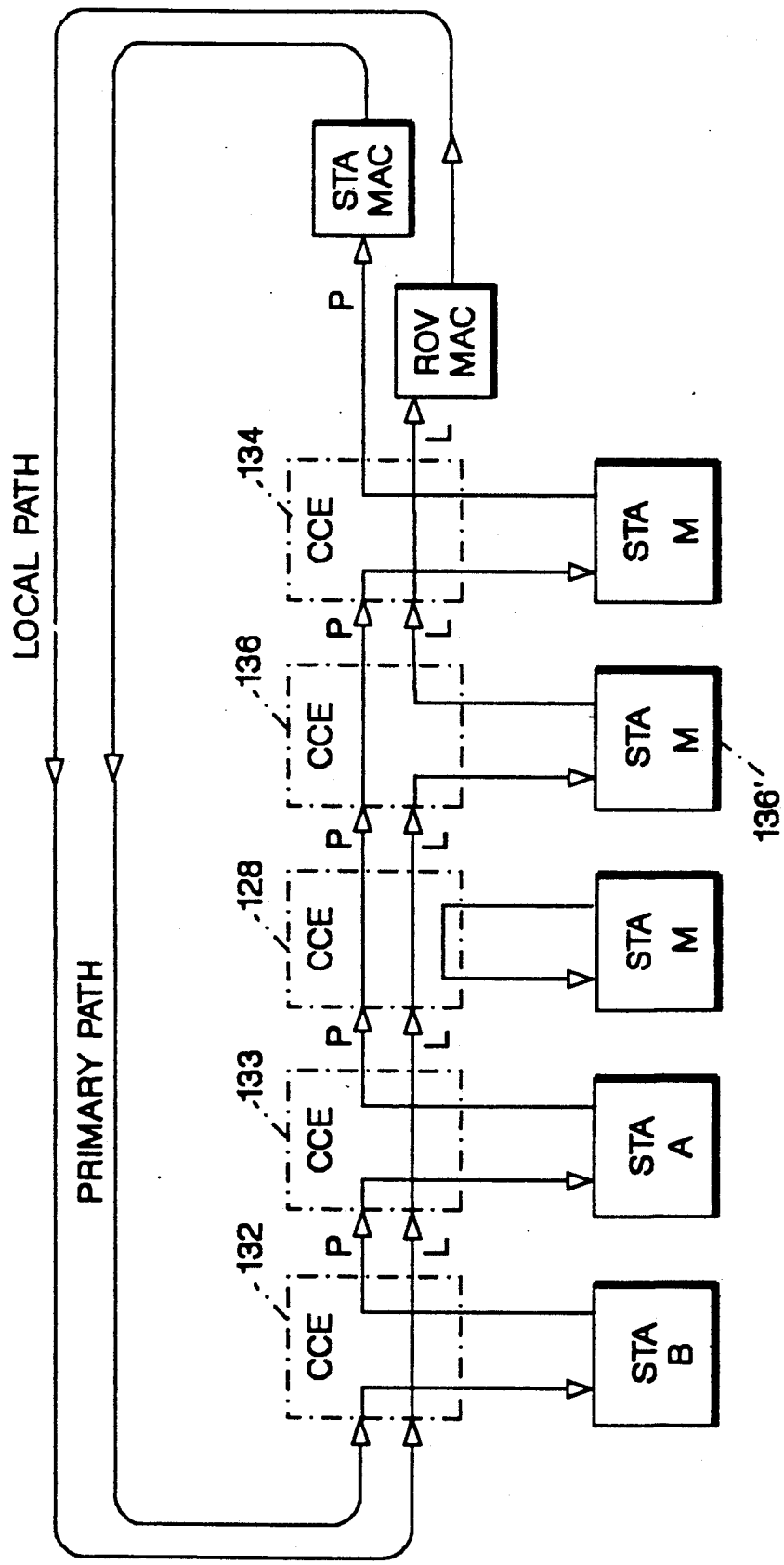
FIG. 8 shows an example of a configured concentrator.

Before discussing the insertion process in greater detail, it is worthwhile examining a configured concentrator with stations inserted in the primary path and stations inserted in the local path. FIG. 8 shows a schematic of a configured concentrator. Stations in the primary path can communicate with other stations (not shown) in the FDDI network, while stations on the local path can perform a plurality of tests before inserting in the main ring. The concentrator includes a station MAC (STA. MAC.) interconnected via a primary path to selected CCEs. The CCEs, in turn, are connected to stations (STA). Similarly, a Roving MAC (ROV MAC) is connected through a local path to selected CCEs which are connected, in turn, to selected stations. As stated previously, each CCE has a separate configuration state machine 90 (FIG. 6) which responds to signals from microprocessor 38 (FIG. 2) to place the CCE in the Isolated State or Insert-P State or Local State. If the CCE is in an Isolated State, it is in communication with the device which is connected to it, but that device is not in either the local or the primary loop. With reference to FIG. 8, CCE 128 is in the Isolated state. If the CCE is in the Insert-P state, the associated station is in the primary path and can communicate with other stations (not shown) which are also in the primary path. With reference to FIG. 8, CCEs 132, 133 and 134 with attached stations are in the primary ring. If a CCE is in the local path, it communicates with the Roving MAC. With reference to FIG. 8, CCE 136 and attached station is in the local path.

With the configuration shown in FIG. 8, the concentrator participates in dialogs with other concentrators and stations in the FDDI primary ring. Stations attached to the concentrator and having a CCE in the Inserted-P State will also be participants. In addition, a station attached to the concentrator with a CCE in the local state can establish an FDDI ring that is separate from the FDDI network. The data flow on this private ring is from the remote station, such as 136', to the roving MAC and back to the remote station. Stations desiring connection to the FDDI network are first inserted into the local path and communicate with the roving MAC over this private ring. With the aid of this ring, the concentrator conducts an internal link confidence test exercise and access control process, enforces policy for the ring, and assists in non-disruptive insertion of station into the main ring of the FDDI network.

Figure 9C:
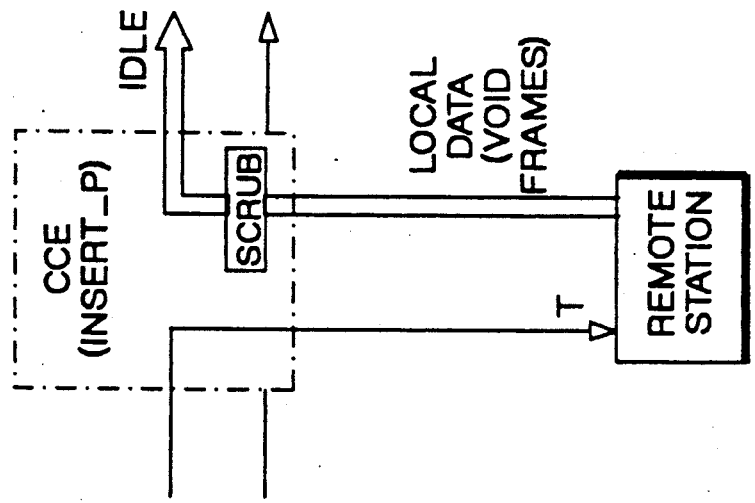
FIGS. 9A, 9B and 9C shows graphical representation of the insertion process according to the teachings of the present invention.
Figure 9B:
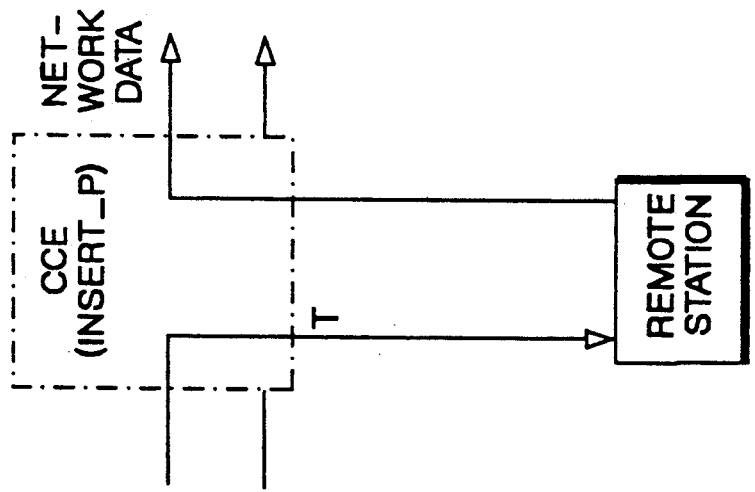
Figure 9A:
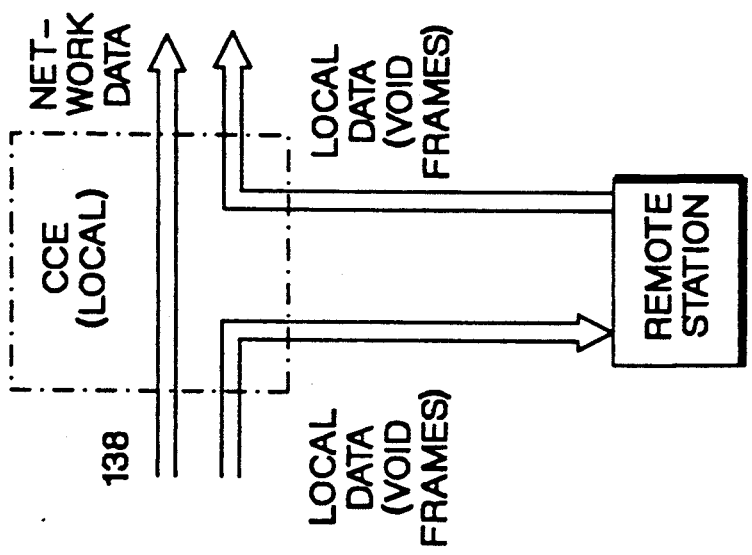

Once the test on the local loop indicates that the station is ready to be inserted into the main FDDI ring, the insertion proceeds as is shown graphically in FIGS. 9A, 9B and 9C. With respect to FIG. 9A, the CCE is first configured in the local state. In this state, a token (T) appended to network data is circulating on a segment 138 of the main ring. As stated previously, this data and the main ring is coupled through station MAC 32 (FIG. 2) to the FDDI network. Also, there is a token (T') appended to local data that is circulating on a segment of the local or private ring. As stated previously, the private ring interconnects a station to the Roving MAC 52 (FIG. 2). As is shown in FIG. 9A, the local data includes void frames which are outputted from the Roving MAC when it holds the local token. It should also be noted that the tokens on the main ring and the local ring are circulating simultaneously. When the local ring merges with the main ring to insert the station which is now on the local ring, it should be done in such a manner that only one token circulates on the main ring. For this reason, the roving MAC captures and holds the token of the private ring while waiting for the token on the main ring to arrive. The arrival of the token on the main ring is detected by token detect logic means 56 (FIGS. 3 and 4).

In addition, the inserting lobe should be joined to the main ring at the point in the data stream between the main ring's token and its network data so that data corruption does not occur. If the token of the private ring is not being held by the moving MAC when the main ring's token arrives at the concentrator configuration element, then the rings should not be joined and the CCE should wait until the next arrival of the main ring's token to attempt insertion.

The schematics set forth in FIGS. 9A and 9B indicate when the Roving MAC holds the token on the private ring. As the main ring token arrives at the entrance of the CCE and the Roving MAC holds the token on the private ring, the CCE state machine changes from the Local state (FIG. 9A) to Insert-P State (FIG. 9B). The change occurs in such a way that existing traffic (i.e., Network Data) on the main ring is passed to the next CCE downstream while its token is passed to the remote station and the ring segment joining the remote station to the Main Ring, see FIG. 9B. Once the station is joined to the main ring, whatever Void Frame is in the link interconnecting the station to the main ring is removed via scrub logic which outputs idle symbols on the ring, see FIG. 9C. The scrubbing process continues until a Token or a network data frame arrives at the input of the CCE from the newly attached station. The scrubbing prevents orphan protocol data units (PDUs) or concatenated PDUs from appearing on the main ring.

Token holding by the Roving MAC increases the probability of inserting the remote station when the main ring's token arrives. However, holding the token can cause private ring recovery if the timers associated with that ring are not satisfied. In particular, the expiration of either the valid transmission timer (TVX) or the token rotation timer (TRT) with a late count (LATE-CT) greater than zero will initiate ring recovery. The token holding is accomplished when the roving MAC transmits a continuous series of synchronous Void Frames. Void frames are conventional FDDI frame which are issued to satisfy the timing requirements of the local ring. Thus, the detailed description of these frames will not be given. The frames are transmitted until the token rotation timer expires. The Roving MAC then releases a token. Since the station to be inserted has not yet been allocated synchronous bandwidth and the roving MAC has held the token for a time equal to the token rotation time, the remote station will not be able to send any frames. For this reason, the token will return to the Roving MAC in a time determined by the propagation delay of the private ring. Each time the token returns, the roving MAC transmits a continuous series of synchronous Void Frames for a period equal to T-OPR of the private ring minus its propagation delay. Thus, the remote station will not accumulate additional lateness. Ring recovery is avoided by the transmission of void frames while holding the token, and the release of the token when TRT expires in the roving MAC.

Unless corrective action is taken, reconfiguration of the concentrator during the insertion process could cause void frames created by the roving MAC to appear on the main ring. To prevent these frames from appearing as orphaned PDUs, scrub logic of the CCE replaces symbols coming from the remote station with idle symbols until it detects the beginning of a token or a frame that is not a void frame. At that time, the data from the remote station is forwarded without change to the next station on the main ring. This completes the description of the insertion process. Having completed the recited process, the remote station is now non-disruptively inserted in the main FDDI ring. The insertion is accomplished without executing a Claim Process on the main ring, corrupting network traffic or creating orphan PDUs. Also, this insertion process does not impose a critical timing constraint and does not decrease the utilization of the main ring. The main ring utilization is not decreased because the main token is not captured.

As stated above, even if the inserting station requires a shorter token rotation period than the present one that is being used in the main ring, the station can also be inserted without disrupting network traffic unnecessarily. Arguably, the station to be inserted has to initiate a claim process to lower the token rotation time of the main ring to match that of the station. However, the present invention allows a disruptive process which does not corrupt network data. For this reason, the remote station is inserted between the token and the network traffic following the same procedure used for non-disruptive insertion. Once inserted, the station is operating with a token rotation time less than that of the main ring. Unless the station initiates ring recovery, it will continue to operate on the main ring until its token rotation timer expires with a late count greater than zero. At that time, the claim process is executed and the new value of token rotation time is determined. The time required for this to happen is a random variable which depends upon the difference between the two token rotation times, the propagation delay of the network and the traffic load on the network. The most desirable time for the station to execute the claim process is immediately behind any network traffic that might be on the main ring.

By following a de-insertion procedure, the present invention allows a station to be removed from the main ring without corrupting network traffic. This procedure is based upon the use of the "Slave Station Bypass" function of the concentrator. This function appears in the list of extended functions of the concentrator in the FDDI standard. The "Slave Station Bypass" allows a station to explicitly request to be bypassed. This request is in the form of an FDDI frame sent from the station and addressed to the "Bound MAC" of the attaching concentrator. The information contained within this frame instructs concentrator configuration management to initiate a bypass of the requesting station. The microprocessor subsystem writes to the associated CCE's command register to instruct it to change from Insert-P to Isolated state. The configuration state machine of the CCE then waits until the main token plus the 16 following symbols have been passed to the next CCE in line before changing to the Isolated state. This is indicated by the token-plus-16 signal of the token detect plus 16 circuit means. The combination of this procedure and circuitry will de-insert the station without corruption of the network data.

While the invention has been particulary shown and described with reference to the preferred embodiment thereof, it will be understood by those skilled in the art that various changes in form and details may be made therein without departing from the spirit and scope of the invention.

Having this described our invention, we claim:

1. In a serial communications network having a communications media, a set of stations connected directly to the media, another set of stations connected to at least one multiport concentrator which, in turn, is connected to the media with communicating stations being arranged into a main serial loop with each communicating station allotted a fixed period of time (T1) within which it may transmit frames onto said network and at the end of the fixed period of time, appends a token to its transmission, said token being available for use by another station having frames to be transmitted onto said network; an improved method for controlling the insertion of stations into the network comprising the steps of:

(a) providing in said multiport concentrator a local loop with a local circulating token thereon, said local loop including a Roving MAC, at least one concentrator configuration element (CCE) and at least one station to be inserted in the main serial loop;

(b) capturing the local circulating token by said Roving MAC;

(c) monitoring the main serial loop by said at least one concentrator configuration element to detect frames thereon;

(d) upon detecting a frame, said at least one concentrator configuration element forwarding said frame to downstream stations already in the main serial loop; and (e) said at least one concentrator configuration element transmitting from the main serial loop to an inserting station a main token that is appended to said frame.

2. The method of claim 1 further including the steps of:

(f) receiving the main token by said inserting station; and (g) said inserting station using the main token to transmit data on the main serial loop.

3. The method set forth in claim 1 further including the steps of:

Issuing "Void Frames" from the Roving MAC while holding the local circulating token.

4. The method of claim 3 further including the steps of providing a scrub logic mean sin said concentrator configuration element, said scrub logic means removing the void frames and simultaneously issuing idle signals with said idle signals filling a gap existing between old frames on said main serial loop and new frames being inserted on the main serial loop from a newly inserted station.

5. In a serial communications network having a communications media, a set of stations connected directly to the media, another set of stations connected to at least one multiport concentrator which, in turn, is connected to the media with communicating stations being arranged into a main serial loop with each communicating station allotted a fixed period of time (T1) within which it may transmit frames onto said network and at the end of the fixed period of time, appends a token to its transmission, said token being available for use by another station having frames to be transmitted onto said network; an improved method for controlling the insertion of stations into the network comprising the steps of:
  (a) providing in said concentrator a local loop with a local token circulating thereon, said local loop including a concentrator configuration element, a Roving MAC and a station to be inserted in the main serial loop;
  (b) allotting a second fixed period of time (T2) in which the station may transmit frames onto the local loop;
  (c) capturing the local circulating token by said Roving MAC;
  (d) monitoring the main serial loop by the concentrator configuration element;
  (e) said concentrator configuration element selectively passing frames on said main serial loop to active downstream stations already in the main serial loop;
  (f) said concentrator configuration element transmitting to an inserting station a main token appended to passed frames;
  (g) correlating T1 and T2 in the inserting station;
  (h) generating in the inserting station, a new main token rotation time to enable access to the main serial loop only if T2 is less than T1; and
  (i) all stations on the main serial loop using the new main token rotation time of step (h) to enable access to the main serial loop.

6. The method of claim 5 wherein establishment of T2 step (b) further includes the steps of (b1) generating a value for T2 on the local loop with the Roving MAC bidding T1 as its value.

7. In a serial communications network having a main ring with counter rotating communications medium for transporting data among stations coupled to said medium directly and coupled to at least one multi port concentrator which, in turn, is connected to said medium an improved method for allowing the stations entry into the main ring comprising the steps of:
  (a) providing in said multi port concentrator a microprocessor and a local ring for interconnecting a Roving MAC, a concentrator configuration element and one or more stations which are seeking entry into the main ring;
  (b) determining with said microprocessor a first value for a token rotation timer (TRT) on the main ring;
  (c) determining with said Roving MAC a second value for TRT on the local ring;
  (d) correlating in an entering station the first value and the second value;
  (e) in the concentrator configuration element,
    (i) capturing a token circulating on the local ring,
    (ii) passing network data on the main ring to downstream network nodes and
    (iii) transmitting to the entering station a token that is appended to said network data;
  (f) receiving the token in said entering station; and
  (g) said entering station, using the second value to establish the token transmission time for the main ring if the second value is less than the first value.

8. In a serial communications network having a main ring with counter rotating communications medium for transporting data among stations coupled to said medium directly and stations coupled to at least one multi port concentrator which, in turn, is coupled to the medium; an improved method for allowing stations entry into the main ring comprising the steps of:
  (a) providing in said multi port concentrator, a microprocessor and a local ring for interconnecting a Roving MAC, a concentrator configuration element and one or more stations which are seeking entry into the main ring;
  (b) determining with said microprocessor a first value for a token rotation timer on the main ring;
  (c) determining with said Roving MAC a second value for TRT on the local ring;
  (d) correlating in an entering station the first value and the second value;
  (e) in the concentrator configuration element,
    (i) capturing a token circulating on the local ring,
    (ii) passing network data on the main ring to downstream network nodes and
    (iii) transmitting to an entering station a token that is appended to said network data;
  (f) receiving the token in said entering station; and
  (g) transmitting from said entering station network data with the token appended to downstream node if the second value is equal to or greater than (>) the first value.

9. In a serial communications network having a main ring with counter rotating communications medium for transporting data among stations coupled to said medium directly and stations coupled to at least one multi port concentrator which, in turn, is connected to the medium; an improved method of allowing stations entry into the main ring comprising the steps of:
  (a) providing in said multi port concentrator a local ring for coupling stations seeking entry into the main ring;
  (b) capturing with a first means a local token circulating on said local ring;
  (c) monitoring the main ring with a second means to detect a main token thereon;
  (d) upon detecting the main token, the second means forwarding a frame to which the main token is attached to downstream nodes already in the main ring; and
  (e) said second means, transmitting the main token to the local ring.

10. In a serial communications network having a main ring to allow communications between stations coupled directly to the main ring or coupled to at least one multi port concentrator which, in turn, is coupled to said main ring; a device for allowing entry of at least one station into the main ring comprising:
  a local ring positioned within said multiport concentrator, said local ring being an entry point for statios seeking entry into the main ring;
  first means in said multiport concentrator for capturing a local token circulating on said local ring;

second means coupled to the first means; said second means monitoring the main ring to detect a main token thereon upon detecting the main token, forwarding a frame appended to said main token to downstream nodes already in the main ring and transmitting the main token to the local ring.

11. In a serial communications network having a main ring with counter rotating communications medium for transporting data among stations coupled to said medium directly and coupled to at least one multi port concentrator which, in turn, is coupled to the medium an improved method for allowing stations entry into the main ring comprising the steps of:

(a) providing in said multi port concentrator a controller, a local ring for interconnecting one or more stations which are seeking entry into the main ring with said local ring including a Roving MAC coupled to the controller and a concentrator configuration element;

(b) determining in said controller a first value for a token transmission timer (TRT) on the main ring;

(c) determining in said Roving MAC a second value for TRT on the local ring;

(d) correlating in a station seeking entry into the main ring the first value and the second value;

(e) if the second value is less than the first value, capturing in the Roving MAC a token circulating on the local ring, at the concentrator configuration element passing network data on the main ring to downstream network nodes, and said concentrator configuration element transmitting to an entering station a token that is appended to said network data.

* * * * *